(12) United States Patent
Sojka et al.

(10) Patent No.: US 7,541,967 B2
(45) Date of Patent: Jun. 2, 2009

(54) SOUNDING TRANSFORMATION AND RECOGNITION

(75) Inventors: Jan J. Sojka, Logan, UT (US); Donald D. Rice, River Heights, UT (US); Donald C. Thompson, Hyde Park, UT (US)

(73) Assignee: Space Environment Corporation, Providence, UT (US)

( * ) Notice: Subject to any disclaimer, the term of this patent is extended or adjusted under 35 U.S.C. 154(b) by 161 days.

(21) Appl. No.: 11/639,536

(22) Filed: Dec. 14, 2006

(65) Prior Publication Data

US 2008/0143571 A1 Jun. 19, 2008

(51) Int. Cl.
*G01S 13/95* (2006.01)
(52) U.S. Cl. .................................. 342/26 R
(58) Field of Classification Search ............ 342/26 R, 342/165; 382/202; 702/1–3, 6–8, 11, 14, 702/16–18, 127, 180, 189; 367/14–80, 87; 73/570–672, 152.01–152.62; 181/101–124
See application file for complete search history.

(56) References Cited

U.S. PATENT DOCUMENTS

| | | | |
|---|---|---|---|
| 3,069,654 A | | 12/1962 | Hough |
| 5,343,204 A | * | 8/1994 | Farmer et al. ............... 342/25 F |
| 5,943,629 A | * | 8/1999 | Ballard et al. .................. 702/2 |
| 2008/0143571 A1 | * | 6/2008 | Sojka et al. ................. 341/144 |

OTHER PUBLICATIONS

Roughan, Matthew, "Trace extraction from oblique ionograms", Jul. 9, 2003.*
Chen, Li, et al., "Intelligent curve tracking algorithms and implementations", SPIE Conference on Automatic Target Recognition VIII, Orlando, Florida, Apr. 1998.*
Parker, James R, "Algoritthms For Image Processing And Computer Vision", John Wiley & Sons, Inc., pp. 296-298 and 300, 1997.

* cited by examiner

*Primary Examiner*—Dan Pihulic
(74) *Attorney, Agent, or Firm*—Townsend, Townsend & Crew LLP (57) ABSTRACT

A method for scaling and converting sounding data into physical properties of a scanned medium is disclosed. In one embodiment, sounding data is received and transformed into phase space, where the phase space transformation linearizes the sounding data. The slope and intercept of the phase space data is determined and then converted into physical parameters. The physical parameters are then returned. In a more specific embodiment, the critical frequency is returned for an ionogram.

20 Claims, 11 Drawing Sheets
(1 of 11 Drawing Sheet(s) Filed in Color)

SOUNDING TRANSFORMATION AND RECOGNITION

FIELD OF THE INVENTION

The present invention relates generally to methods for analyzing and identifying traces in sounding recordings.

BACKGROUND OF THE INVENTION

Figure 1:
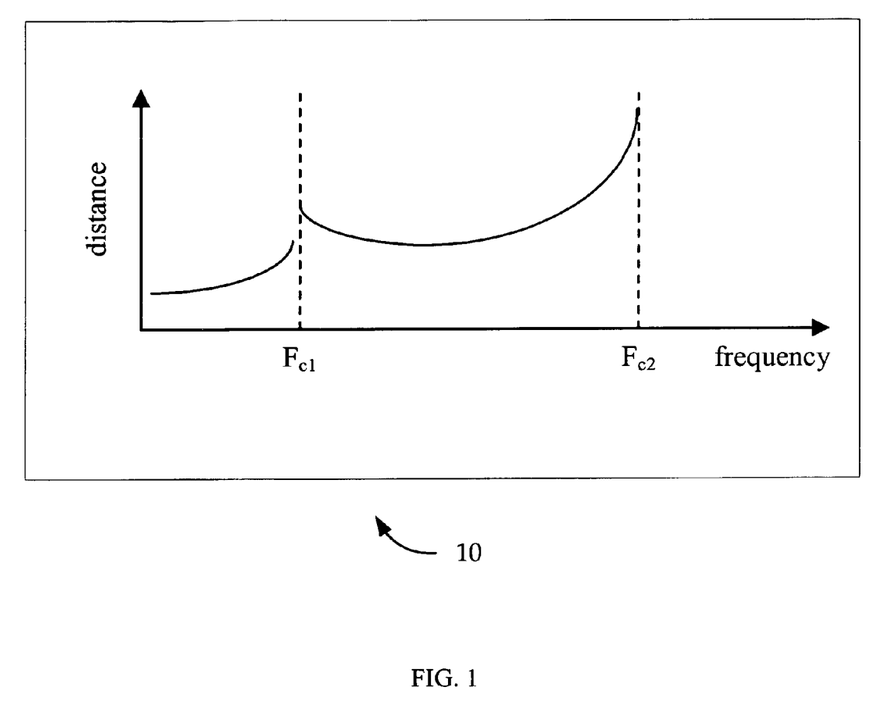
FIG. 1 shows idealized sounding data with two critical frequencies.

Sounding data often consists of a series of echoes in frequency vs. distance space. Distance is typically derived from the time delay between when a transmitted pulse at a given frequency is sent and an echo is received. The distance value may be scaled by a nominal propagation velocity. When the distance is plotted against frequency the echoes often form traces characterized by cusps. An idealized sounding 10 is shown in FIG. 1, showing two cusps at $F_{c1}$ and $F_{c2}$.

Figure 2:
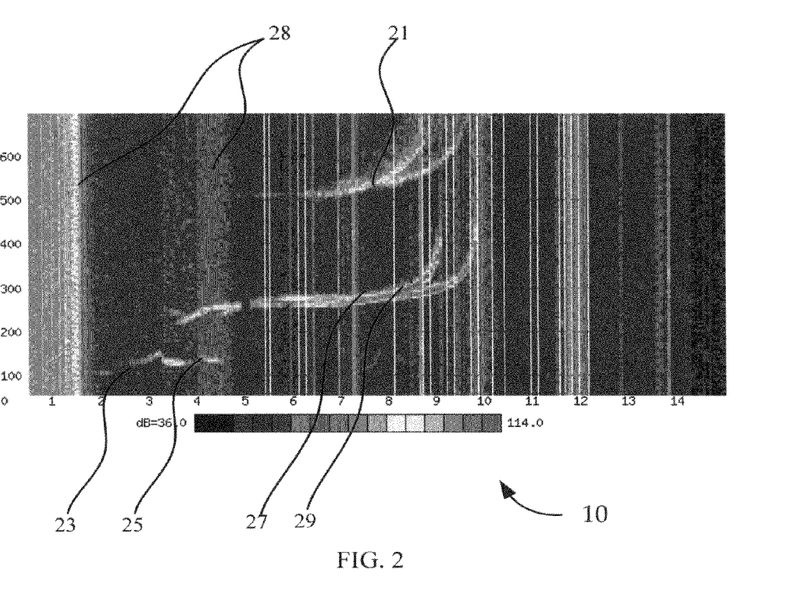
FIG. 2 shows typical raw ionogram data according to one embodiment of the present invention.

Often soundings may include multiple traces offset in frequency and/or distance and may include interferences from various sources. Traces may also be incomplete or vary in thickness. A typical raw ionospheric sounding (ionogram) 20 is shown in FIG. 2, showing multiple traces, interference bands and thick traces. Such complications make it difficult to determine trace parameters, such as the critical frequency, and/or distance. The distance coordinate in ionograms is referred to as virtual height. Its relation to the actual or true height of the trace depends on the amount of ionization present.

"Scaling" is the recognition and characterization of traces in a sounding. Traditionally, scaling occurs at some later time after the sounding was performed and is often performed by a trained technician. Modern sounders often incorporate software that attempts to scale the sounding in near-real time, but the quality of the results has been highly variable. In the case of ionospheric soundings, for example, interference and/or multiple echoes lead to misleading results.

Accordingly, there is a need in the art for a system to return accurate distance and frequency estimates for cusps and traces in the sounding data.

BRIEF SUMMARY OF THE INVENTION

One embodiment of the present invention includes a scaling method for analyzing soundings comprising acquiring sounding data of a scanned medium; transforming the sounding data into phase space data; determining the slope and intercept of the phase space data; converting the slope and intercept of the phase space data into physical parameters corresponding to physical properties of the scanned medium; and returning these physical properties. The sounding data may also include ionospheric soundings and the medium may include the ionosphere. The step of transforming sounding data may also include linearization of the sounding data. This linearization may occur by applying a basis function with a well defined vertical asymptote. A histogram analysis may be performed on the phase space data. The data may be transformed using a function such as $d=(B/(f-A))^{1/n}$ where n may be any positive number or restricted to integers; n may also be greater than 1 and/or between 4 and 15. A and B may be calculated for each value of d and n. A histogram may also be created for each returned A and B value. The most populous bin in the histogram may return physical features of the scanned medium. The critical frequency may be returned as the value of A and the true height of the layer may be estimated by setting $f=0.83 \cdot A$ and calculating $d_B=(B/(-0.17A))^{1/n}$. The embodiments of this invention may also include noise reduction algorithms.

Another embodiment of the present invention includes a method for determining physical properties of a physical medium comprising transmitting an electromagnetic pulse at a plurality of frequencies into a scanned medium; receiving pulse echoes from the scanned medium; recording the sounding data comprising at least the time delay of these echoes and the frequency of the pulse; transforming the sounding data into phase space data; applying a histogram analysis to the phase space data to determine the slope and intercept of the phase space data; using a model of the physics of the medium and raytracing to independently estimate the expected phase space slope and intercept; and iteratively adjusting model parameters (e.g., ionospheric electron density) until the model estimate converges with the sounding estimate. The transforming step may include linearization of the sounding data. This approach may be more computationally intensive than simple scaling, but may provide a much more detailed description of the medium from the model once convergence is achieved.

Another embodiment of the invention includes a method for scaling or determining the model parameters of the physical medium comprising: receiving ionogram sounding data; linearizing the sounding data using $d=(B/(f-A))^{1/n}$; calculating $A_n$ and $B_n$ pairs for a plurality of n values; calculating a distance $d_n$ for each $A_n$ and $B_n$ pair based on a set measurement frequency (e.g., $f=0$ yields $d_n=(B/(-A))^{1/n}$; or $f=0.83 \cdot A$ yields $d_n=(B/(-0.17 A))^{1/n}$); determining which of the $A_n$ and $d_n$ pairs are most common using histogram binning; and returning the most common $A_n$ value as the critical frequency and $d_n$ as the characteristic trace height. This embodiment allows histograms for different values of n to be compared directly, allowing the distribution in (A,d,n) space to be studied.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In the appended figures, similar components and/or features may have the same reference label. Where the reference label is used in the specification, the description is applicable to any one of the similar components having the same reference label.

DETAILED DESCRIPTION OF THE INVENTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

The embodiments of the present invention use unique methodologies that can provide indications of the quality of a scaling, as well as the desired scaled parameters. These methodologies may be used for any type of sounding data or sounding like data, including, for example, ionogram soundings. These embodiments may be performed on archived, historical, or real time sounding data. These embodiments can operate on the echo distance (delay time) and frequency. The embodiments of the invention may also consider other echo parameters. These embodiments may be performed in the sounding hardware for near-real-time results, after the sounding using recorded data or on archived sounding data.

One embodiment of the present invention returns distance and frequency data from, for example, ionogram soundings. FIG. 2 shows a typical raw ionogram sounding 20. Ionogram soundings typically include two sets of primary traces. The first set 23, 25 usually occurs in the 90-150 km range, is due to the ionospheric E-region, and exhibits a cusp just above 3 MHz. The first set is further characterized by a flat segment that extends to nearly 5 MHz, is called "sporadic E", and is of scientific interest. This second segment 25, in some cases, may obscure or contaminate the other traces. The second set of primary traces 27, 29 in the 200-400 km range is produced by the ionospheric F-region. Each set contains two distinct traces caused by the interaction of the earth's magnetic field with the probing pulses. Within each set, the traces on the left 23, 27 are called the "ordinary" and those on the right 25, 29 are called "extraordinary" traces.

The Ionogram 20 also shows two of the many interference bands 28. Interference bands may be caused by broadcast transmitters. Second hop traces are also shown at 21. Second hop traces 21 are caused by pulses reflected from the earth and then being reflected a second time by the ionosphere.

Sounding processes can be performed using specialized hardware that can generate a pulse (possibly with some form of coding such as the Barker code) at a given frequency. The hardware can transmit a pulse into a medium of interest and then record echoes for a fixed amount of time. Depending on the hardware, various echo parameters such as amplitude, Doppler shift, and wave polarization may also be recorded.

After the recording time has elapsed, the procedure is performed at the next frequency. A sounding consists of all of the echoes and associated parameters recorded over the range of probing frequencies. For example, the recording medium may include the atmosphere, and may, more specifically be the ionosphere.

Figure 3:
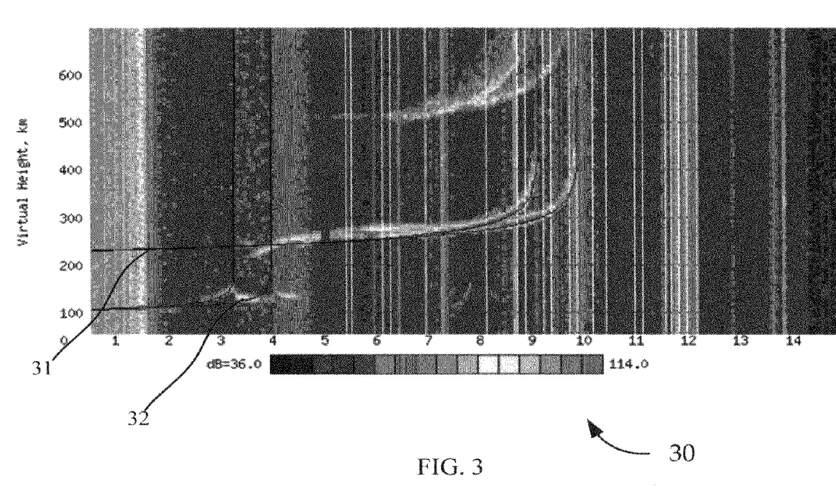
FIG. 3 shows the raw ionogram data from FIG. 2 with the results from one embodiment of the present invention superimposed.

One embodiment of the present invention returns approximate curves 31, 32 representing the ionogram trace as shown in the graph 30 in FIG. 3. In this embodiment the data may be received, cleaned, transformed into phase space, the slope and intercept of pairs of points in the phase space data is computed, these values are sorted into bins, and then physical features and/or mathematical principles are applied to return, for example, distance and frequency parameters.

The sounding data may be received by any method. For example, the data may be received directly from a sounding instrument, from sounding data digitally stored or from a scanned and digitized sounding image.

The sounding data may be cleaned by an algorithm that reduces noise and/or interference levels as much as practical without removing trace information. Many image processing algorithms are known in the art and may be used to accomplish this task. No particular algorithm is required. Such algorithms may include, for example, low-pass image filtering and amplitude threshold filtering.

Whether or not the sounding data was "cleaned", the data may be transformed into phase space. The goal of this transformation is to linearize the traces. Looking at idealized sounding 10 in FIG. 1, there are two traces. The critical frequencies, $F_{c1}$ and $F_{c2}$ and the distance from the sounder at certain frequencies may be scientifically meaningful. A function $d=F(f)$ may be used to characterize a sounding trace, where f is the frequency along the x-axis and d is the distance from the sounding along the y-axis. A function F may be chosen such that as the frequency approaches the critical frequency the distance approaches infinity. One such exemplary function is $d=(B/(f-A))^{1/n}$, where A is the critical frequency and B is the slope of the trace. Other basis functions may be used, such as, for example, hyperbolic trigonometric functions. Rearranging this function provides a linear function, $f=A+B\,x$, where $x=d^{-n}$ (in physically meaningful systems, d>0, n>0, and x is finite). Thus, for each point in sounding space (f, d) a point in phase space (f, x) can be found for each value of n. Using simple algebra, for each pair of frequency and distance points in the sounding and for a given n, we can find A and B. As the frequency (f) approaches A, the distance approaches infinity. Thus, A represents the critical frequency of the sounding.

A and B may then be calculated for every pair of frequency and distance points in sounding space and a set value of n. The value of n may be chosen iteratively. For example, n may be any integer between 4 and 15. In other embodiments n is not necessarily an integer. A histogram may be constructed for (A, B) pairs for each n within this range. Each calculated (A, B) is placed in a bin and the number of (A, B) pairs in each bin may be tallied. The bin size should be chosen to be consistent with spatial and frequency resolution of the sounder. The bin with the largest number of (A, B) pairs most likely corresponds to the sounding trace for the chosen value of n. Repeating the procedure for a different value of n provides a different (A, B) histogram. The optimal value of n may be that which minimizes the spread and maximizes the peak magnitude in the (A, B) histogram.

The transformed data may then be used to provide physical properties of the scanned medium. As discussed, A corresponds to the critical frequency of the sounding (the point where distance approaches infinity). For ionograms, an important value is the height at 0.83·A; the trace height parameter. This value may be obtained from the slope B using $d=(B/(0.83·A-A))^{1/n}$. In soundings with multiple traces, this analysis can provide critical frequencies and heights for each trace. Also, the sign of B determines whether the trace is turning up or turning down, allowing both left- and right-side cusps to be identified.

In another embodiment of the invention, a distance d may be used instead of the slope B in the histogram binning process. The distance d may be calculated at a set measurement frequency, such as, for example, f=0, or f=0.83·A. Each calculated pair (A,d) for a given n is then binned and tallied, and the bin with the largest number of (A,d) pairs is chosen to represent the trace being analyzed. This approach may make it easier to compare the spread of histograms for different values of n than comparing (A,B) histograms; this approach may also require more processing time to obtain d for each pair of points.

A simple graphical example of some embodiments of the present invention is shown in FIGS. 4-8. Four points in sounding space (f, d) are plotted in the graph 40 shown in FIG. 4. The points can then be transferred into phase space using the function $x=d^{-n}$. These points (f, d) as well as phase space values or n=2, n=5 and n=10 are shown in the following table.

Figure 4:
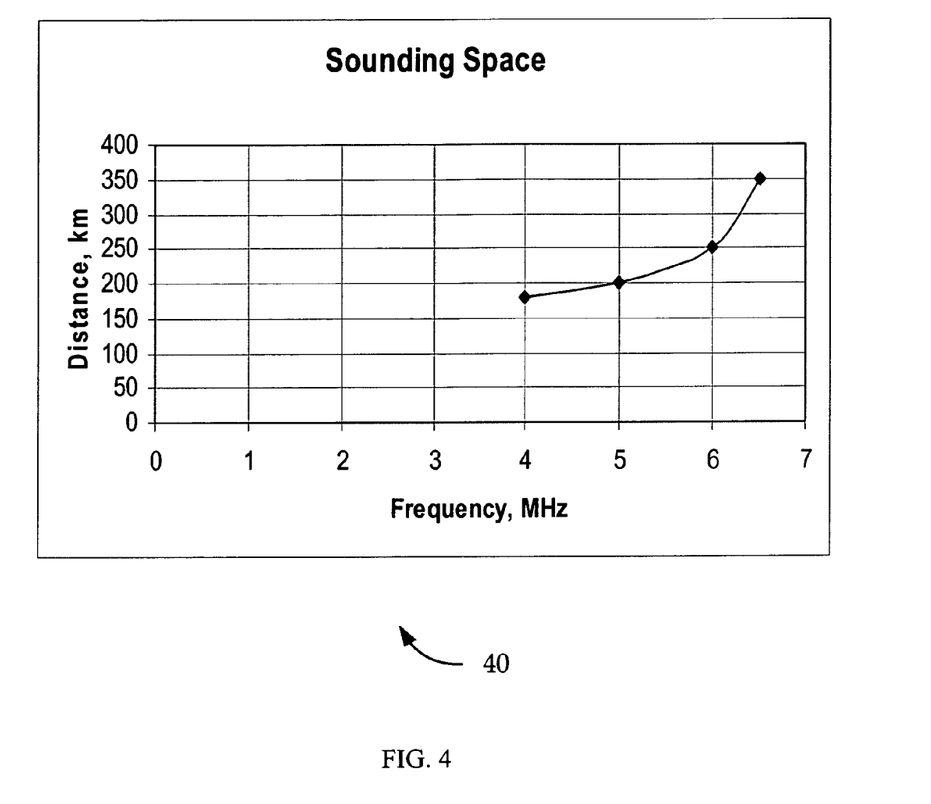
FIG. 4 shows a simplified example of sounding data according to one embodiment of the invention.

| f, MHz | d, km | x, n = 2 | x, n = 5 | x, n = 10 |
|---|---|---|---|---|
| 4 | 180 | 3.08642E−05 | 5.29221E−12 | 2.80075E−23 |
| 5 | 200 | 0.000025 | 3.125E−12 | 9.76563E−24 |
| 6 | 250 | 0.000016 | 1.024E−12 | 1.04858E−24 |
| 6.5 | 350 | 8.16327E−06 | 1.90397E−13 | 3.6251E−26 |

Figure 5:
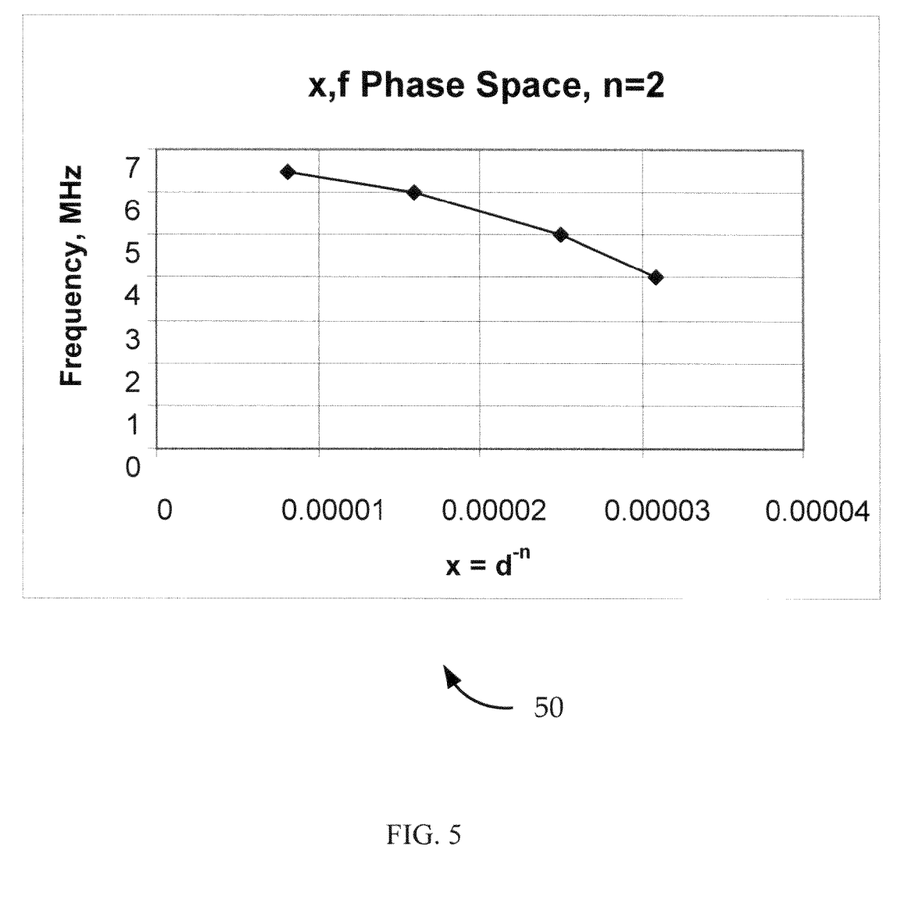
FIG. 5 shows a plot of the transformation for n=2 according to one embodiment of the invention.
Figure 6:
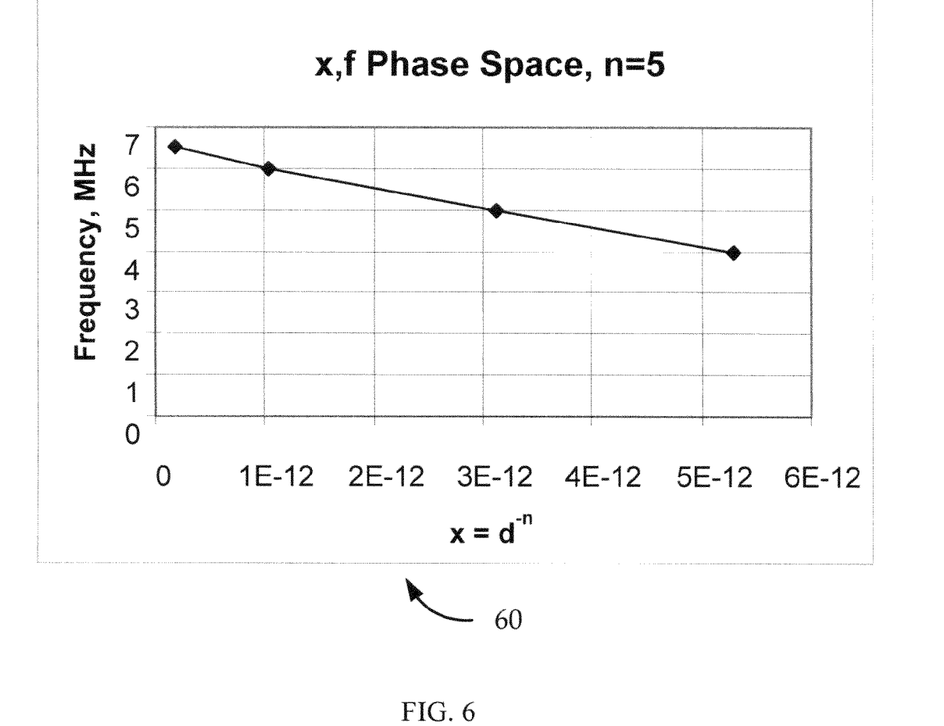
FIG. 6 shows a plot of the transformation for n=5 according to one embodiment of the invention.
Figure 7:
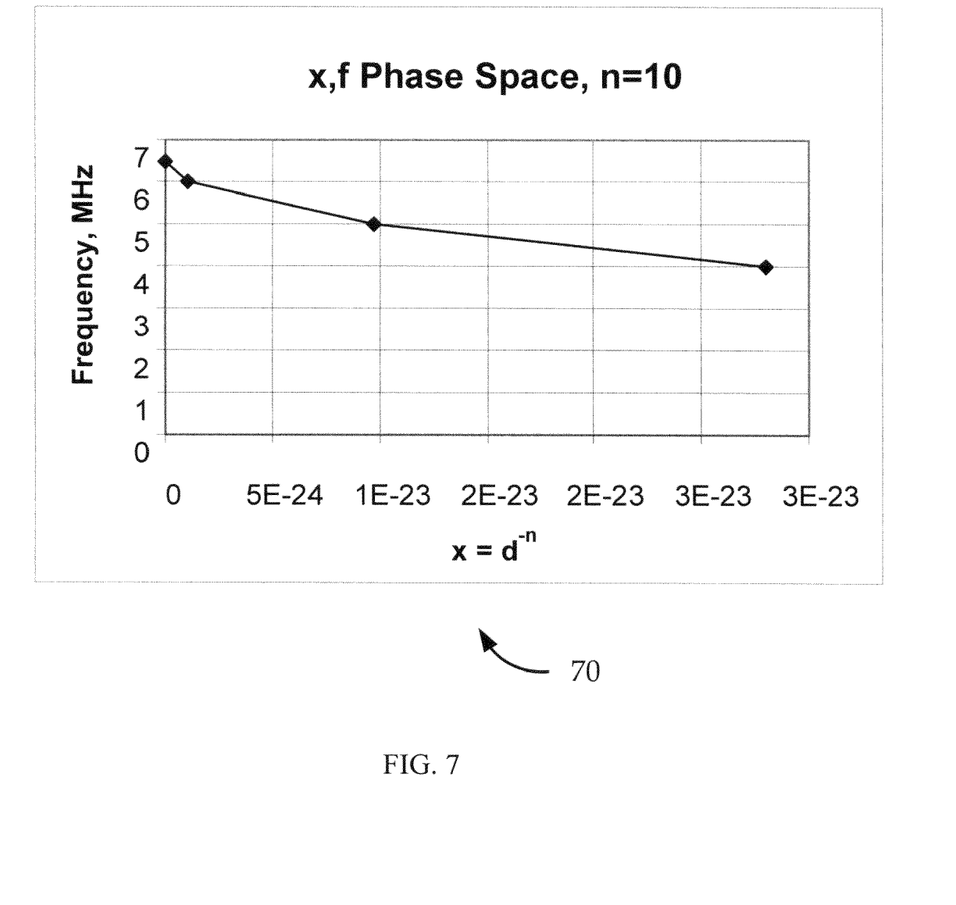
FIG. 7 shows a plot of the transformation for n=10 according to one embodiment of the invention.

FIG. 5 shows a plot 50 of the transformation for n=2. FIG. 6 shows a plot 60 of the transformation for n=5. FIG. 7 shows a plot 70 of the transformation for n=10. Note the substantially linear form of the plots.

Figure 8:
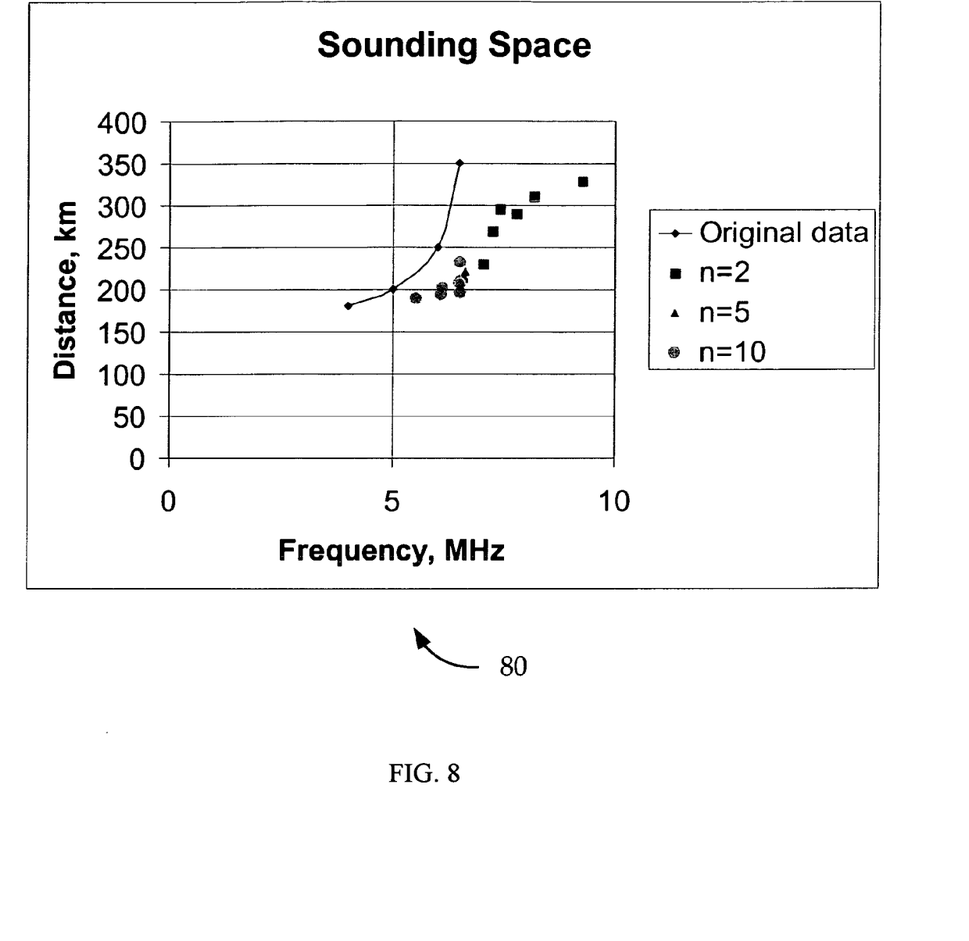
FIG. 8 shows a plot of returned critical frequencies and distances at the critical frequencies for three values of n compared with the sounding data according to one embodiment of the invention.

These four points yield six possible pairs, each of which gives an (A, B) value. FIG. 8 shows a plot 80 of the (A, B) values transformed back to (f, d)=(A, $d_B$) space (with $f_B$=0.83 A). The n=2 results are scattered across a range of frequencies well above the apparent critical frequency, while the n=10 results are scattered below the critical frequency. The n=5 results are very tightly clustered near the critical frequency, indicating an optimal identification. If the values were placed in bins and a histogram was created, a peak in the histogram would occur around frequencies associated with n=5. In realistic soundings, noise and interference may introduce random points in the histogram or scatter plot, and additional traces may produce additional point clusters, each with a different optimal n value.

In another embodiment of the present invention, the sounding data may be cleaned by restricting the data to known areas of interest. For example, in ionogram soundings, the E-region height range is relatively consistent and data below 90 km or above 150 km may be excluded from E-region trace analysis. One may also make a priori restrictions, such as eliminating frequencies below 1.7 MHz from consideration, which are usually heavily contaminated by AM broadcast transmissions.

In another embodiment of the present invention, the sounding data may be cleaned by eliminating points that are not sounding echoes at all based on the physics of the medium. This may include discarding points below some return power or signal-to-noise ratio, such as, for example, those below 20% of the maximum value. This method excludes weak signal returns and only uses those returns that have a strong signal. Also, if the number of points above a certain threshold at some frequency is deemed excessive, that frequency may be discarded as contaminated by interference.

Using Doppler data, points may also be discarded with unreasonable line-of-sight velocities as set by the user. In ionogram soundings, such points are likely radio interference and not echoes.

In another embodiment of the present invention, the sounding data may be cleaned by discarding multiple echoes at a given frequency. In Ionogram soundings, for example, A strong echo at (d,f) often has images at (m*(d+e),f) where m is image number (m>1) and e is a distance calibration error. Sometimes a legitimate echo from another layer occurs at the image distance (such as an F layer that happens to be at twice the sporadic E height). Such ambiguous points may be eliminated to avoid contaminating the analysis of the higher trace.

In yet another embodiment, the sounding data may be cleaned using image processing filters such as eliminating points that do not have neighbors within some defined range of heights and frequencies. Other generic data cleaning algorithms may be applied to the data. Furthermore, more than one algorithm or technique may be used.

In another embodiment, rough estimates of various regions, such as the E-region and F-region for ionogram soundings, are located using physical models or heuristics. The various embodiments of the present invention are then performed on these regions alone. For example, if an ionospheric model indicates the E trace parameters should be 4 MHz and 110 km, the analysis may be limited to a region within perhaps ±30% of these values, reducing computational requirements and limiting the impact of noise and interference. Often these regions have different shapes in their curves (different optimal n values) and accordingly better approximations can be found searching various regions separately.

In another embodiment, histogram tallies may be weighted by the quality of the data. For example, point pairs with higher signal-to-noise ratios are weighted higher than those with a lower signal-to-noise ratio.

Figure 9:
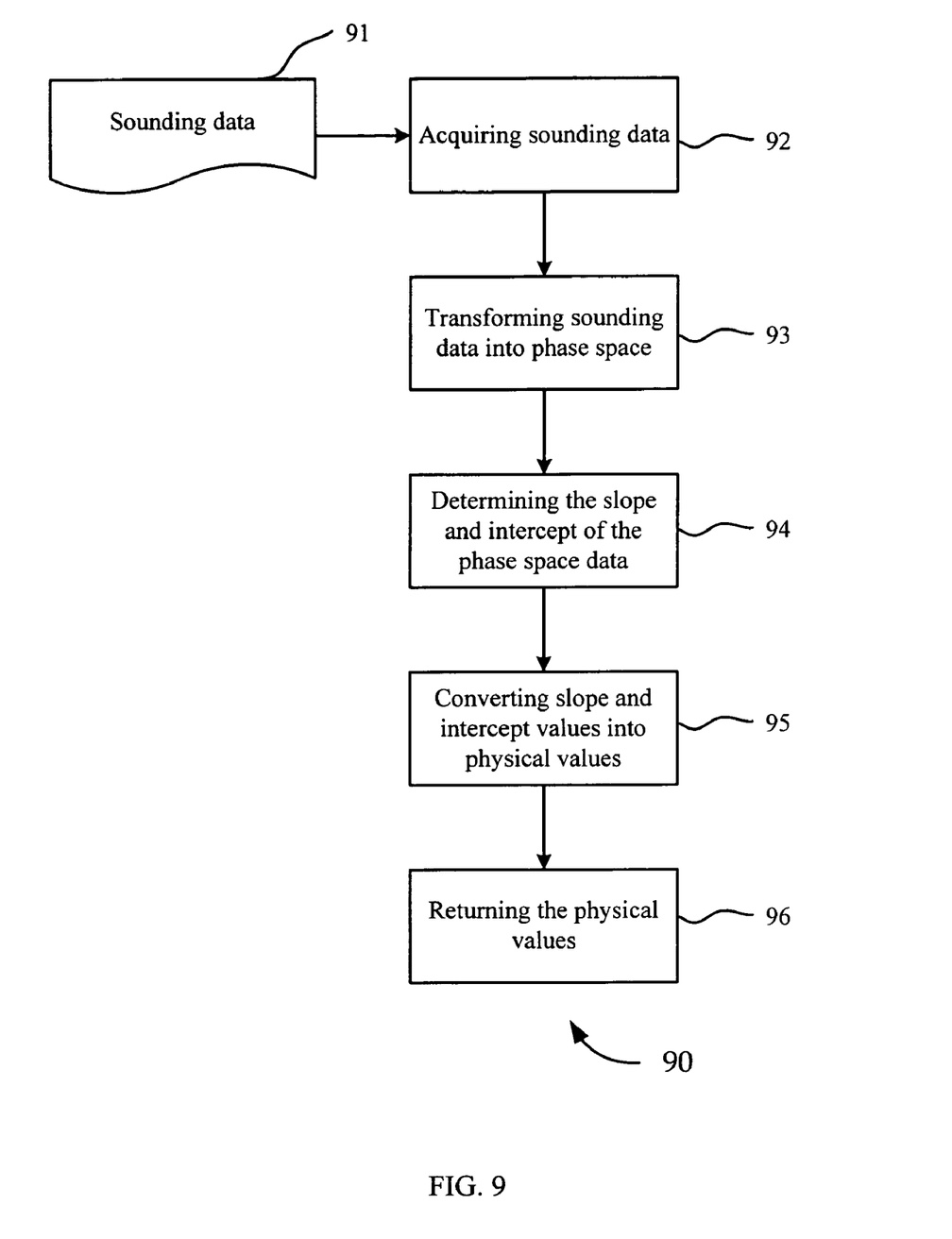
FIG. 9 shows a flow chart of one embodiment of the present invention.

FIG. 9 is a flow chart of the contours of an embodiment of the present invention. Sounding data 91 is received at 92 typically at a computer. The sounding data 91 may be received 92 directly from a sounding instrument, from data stored on the computer or inputted into the computer, or a plot of sounding data digitized and entered into the computer. The sounding data 91 is then transformed into phase space 93 using any mathematical model. The slope and intercept of the phase space data is calculated 94 and these values are then converted into physical values 95 corresponding to features within the scanned medium. Finally, the physical values are returned 96.

Figure 10:
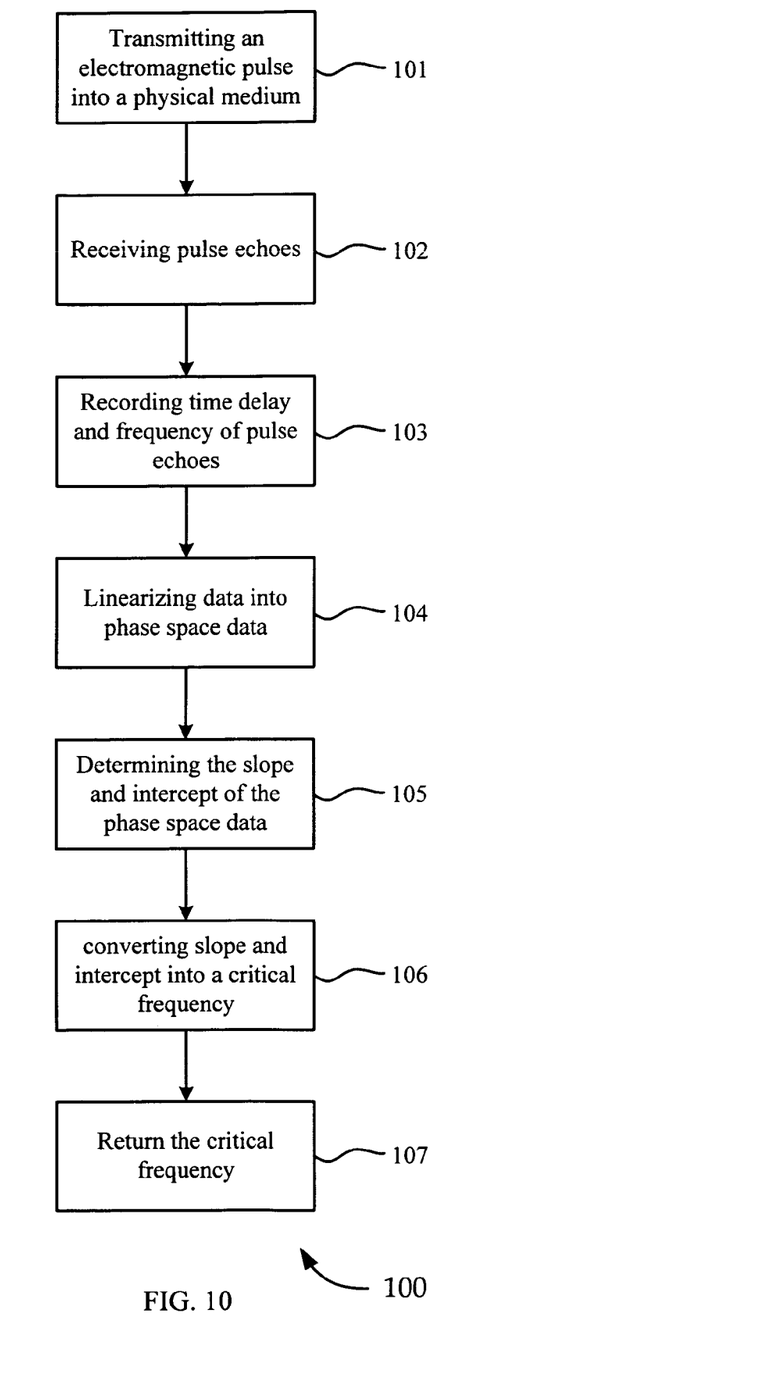
FIG. 10 shows a flow chart of one embodiment of the present invention.

FIG. 10 is a flow chart 100 of another embodiment of the present invention. In this embodiment, an electromagnetic pulse is transmitted into a physical medium 101. A pulse echo is received 102 and the time delay of the echo along with the frequency of the pulse are stored 103. The stored data is linearized into phase space data 104 using an appropriate modeling function. The slope and intercept of the phase space data are calculated 105 and converted into a critical frequency 106. Finally, the critical frequency is returned 107.

Ionogram traces typically include both ordinary and extraordinary traces. The difference in critical frequencies of the ordinary and extraordinary traces is fixed at one half the gyrofrequency at the layer altitude. The gyrofrequency may be accurately estimated from ionospheric models. In another embodiment, the system may look for (A, B, n) pairs where the A values differ by the expected amount. This works best when the two traces are both strong.

In another embodiment of the present invention a number, N, of various embodiments may be pooled. Instead of trying to find the best approximation of the traces using various cleaning methodologies or phase space transfer functions, each of the cleaning functions and/or transfer functions are used and the resulting (A, B) values may be pooled. Outliers may then be eliminated. While some embodiments may not return accurate results for a given data set, an ensemble of N embodiments may tend to return a number of consistent results and a few inconsistent outliers. Failure to achieve consensus may indicate a poor quality sounding. By pooling the results from many embodiments of this invention, this approach can eliminate the need to find the most accurate embodiment. Accordingly, this N-version approach may be exceptionally useful for analyzing sounding returns from a variety of sources. Furthermore, this N-version approach may provide error bars and uncertainties for the returned data.

Figure 11:
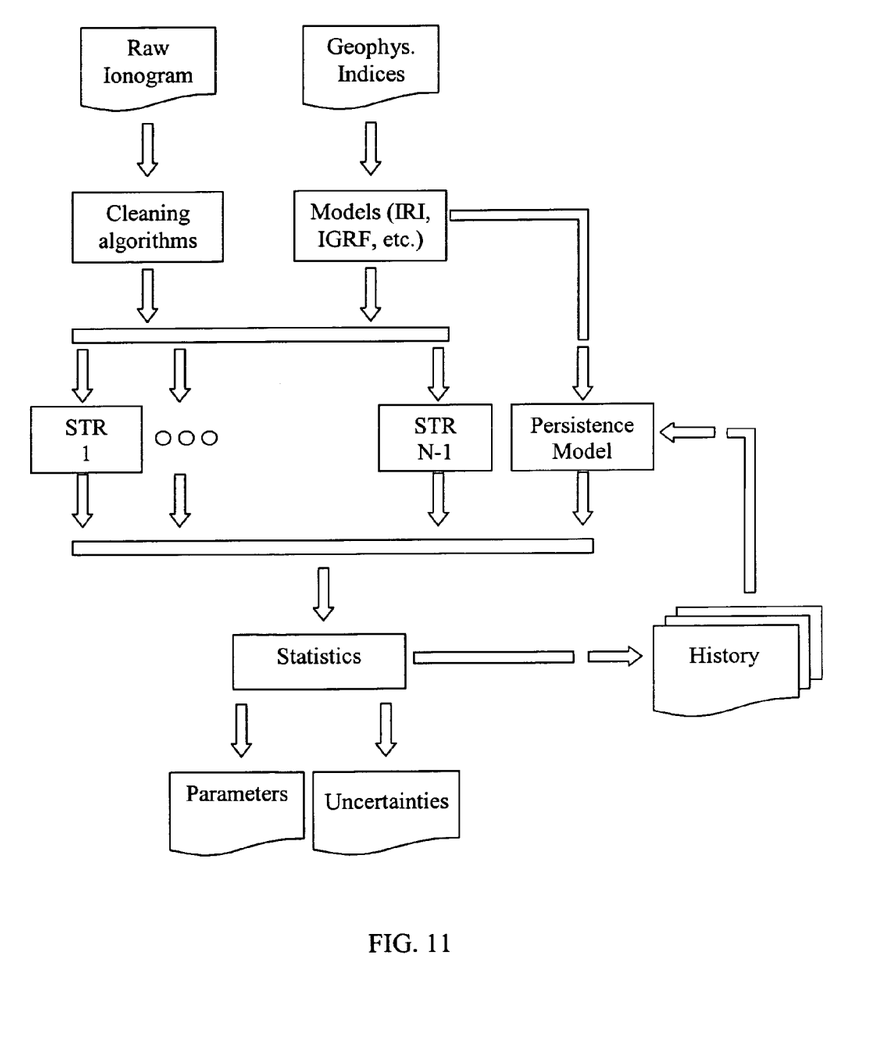
FIG. 11 shows a flow chart of an N-version implementation of an embodiment of the present invention that combines physical model estimates with a running average of scaling results.

Additionally, the N-version approach may permit other estimates of the sounding parameters from sources such as physical models, running averages, or other analysis methodologies, to be combined with the results of this invention. FIG. 11 shows one such N-version implementation using a persistence model that combines physical model estimates with a running average of scaling results in addition to several embodiments of this invention.

Figure 12:
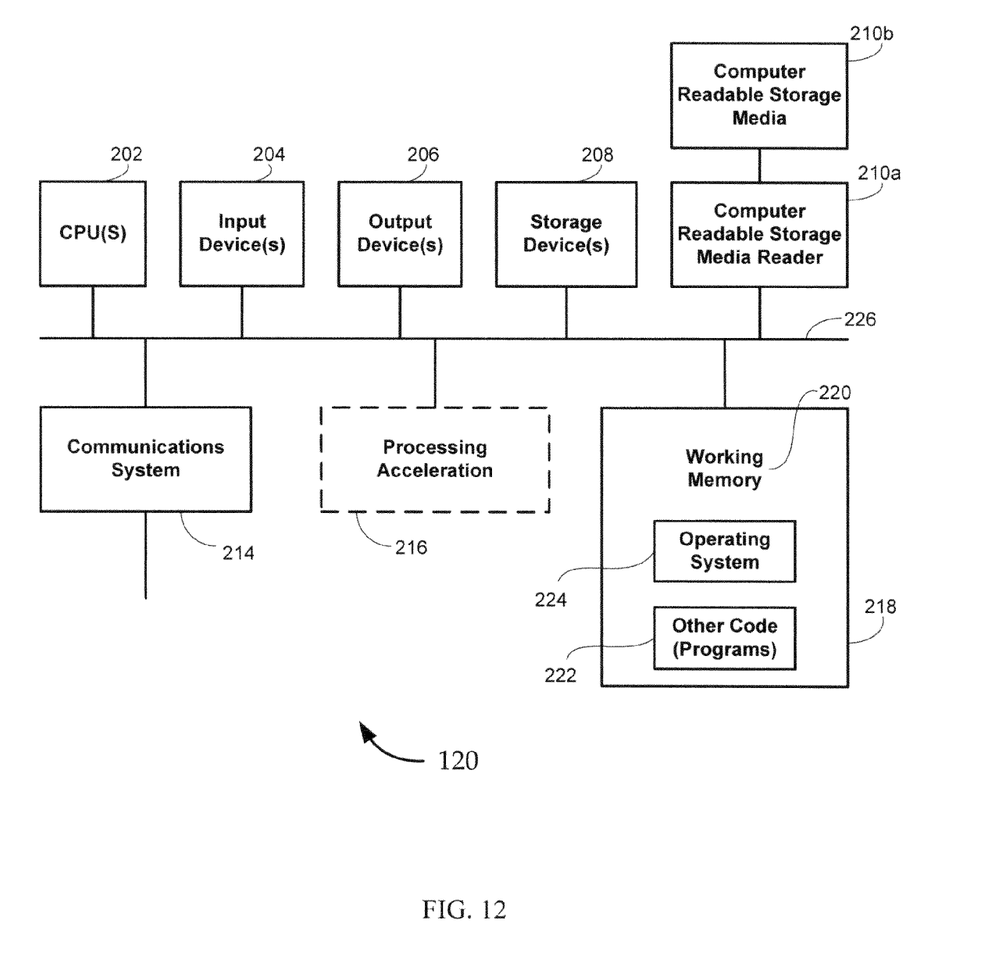
FIG. 12 shows an exemplary schematic illustration of a computer structure that may be used to implement any of the methods or process of the invention.

FIG. 12 provides a schematic illustration of a structure that may be used to implement any of the computational methods disclosed in embodiments of the present invention. The computational device 200 is shown comprised of hardware elements that are electrically coupled via bus 226, including a processor 202, an input device 204, an output device 206, a storage device 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged.

The computational device 200 also comprises software elements, shown as being currently located within working memory 220, including an operating system 224 and other code 222, such as a program designed to implement all or portions of methods and/or processes of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

While the principles of the disclosure have been described above in connection with specific apparatuses and methods, it is to be clearly understood that this description is made only by way of example and not as limitation on the scope of the disclosure.

What is claimed is:

1. A method of scaling sounding data, wherein the sounding data includes frequency and time delay measurements, the method comprising:
acquiring ionospheric sounding data from the ionosphere;
transforming the sounding data into phase space data, wherein the phase space data is substantially linear;
determining the slope and intercept of the phase space data;
converting the slope and intercept of the phase space data into physical parameters corresponding to physical properties of the scanned medium; and
returning the physical properties corresponding to the scanned medium.

2. The method of claim 1 wherein the determining step further comprises performing histogram analysis on the phase space data.

3. The method of claim 2 wherein the linearization further comprises applying a basis function with a well-defined vertical asymptote.

4. The method of claim 3 wherein the step of converting the slope and intercept of the transformed data into physical parameters further comprises applying the function $d = (B/(f-A))^{1/n}$.

5. The method of claim 4 wherein data points in the sounding A and B are calculated.

6. The method of claim 5 wherein a histogram is created for each A, B pair.

7. The method of claim 4 wherein the critical frequency is taken to be A and the true height of the layer is found by setting $f = 0.83 \cdot A$, yielding $d = (B/(-0.17A))^{1/n}$.

8. The method of claim 4 wherein n is greater than 1.

9. The method of claim 4 wherein n is any number between 4 and 15.

10. The method of claim 1 further comprising reducing the noise of the sounding data using an image processing algorithm.

11. A method for determining physical properties of a physical medium comprising:
transmitting an electromagnetic pulse at a plurality of frequencies into a physical medium;
receiving pulse echoes from the medium and recording time delay measurements from when the pulses are transmitted to when the pulse echoes are received, wherein the pulse echoes are returns from the transmitted electromagnetic pulse reflected from within the physical medium;
recording sounding data comprising at least the time delay measurements of the echoes and the frequency of the pulse;
transforming the sounding data into phase space data, wherein the phase space data is substantially linear;
applying a histogram analysis to the phase space data to determine the slope and intercept of the phase space data;
converting the slope and intercept of the transformed data into a critical frequency corresponding to physical properties within the physical medium; and
returning the critical frequency.

12. The method of claim 11 further comprising reducing the noise of the sounding data using an image processing algorithm.

13. The method of claim 11 wherein the transforming of the sounding data includes converting the slope and intercept of the data into physical and applying the function $d = (B/(f-A))^{1/n}$.

14. A method for determining the critical frequency of an ionogram sounding comprising:
  receiving ionogram sounding data;
  transforming the ionogram sounding data into phase space data by linearizing the sounding data using the function $d = (B/(f-A))^{1/n}$;
  calculating $A_n$ and $B_n$ pairs for a plurality of n values;
  determining which of the $A_n$ and $B_n$ pairs are most common for the plurality of n values ; and
  returning the most common $A_n$ value as the critical frequency.

15. The method of claim 14 further comprising returning a distance, wherein the distance is at the critical frequency and is calculated using $d_B = (B/(-0.17A))^{1/n}$.

16. The method of claim 14 wherein the determining step comprises placing each of the $A_n$ and $B_n$ pair into a discrete bin of specific numeric width for each value of n and determining which bin has the greatest number of $A_n$ and $B_n$ pairs.

17. The method of claim 16 further comprising constructing a histogram for each bin.

18. The method of claim 14 wherein n is any number between 4 and 15.

19. The method of claim 14 further comprising reducing the noise of the sounding data using an image processing algorithm.

20. The method of claim 13 wherein n is any number between 4 and 15.

* * * * *